United States Patent
Guerinat et al.

[11] Patent Number: 5,086,794
[45] Date of Patent: Feb. 11, 1992

[54] PLANT FOR TREATING MECHANICAL PIECES IN A WASHING TANK

[76] Inventors: Daniel Guerinat, 6, Rue St. Paul, Paris (F), France; Giuseppe Marolda, V. Biancamano 2, Monza (MI) I; Ettore Alagna, V. Delle Ande 5, Milano (I), both of Italy

[21] Appl. No.: 541,498

[22] Filed: Jun. 21, 1990

[30] Foreign Application Priority Data

Jun. 21, 1989 [IT] Italy .................. 20939 A/89

[51] Int. Cl.⁵ .................................................. B08B 3/04
[52] U.S. Cl. ...................................... 134/56 R; 134/76; 134/140; 414/788.7; 294/81.56
[58] Field of Search .............. 134/76, 83, 84, 140, 134/135, 902, 56 R; 414/225, 226, 788.7, 788.1, 788.2, 788.4, 798.7; 198/418.4, 502.2; 53/447, 540; 294/81.51, 81.56, 67.31

[56] References Cited

U.S. PATENT DOCUMENTS

| | | | |
|---|---|---|---|
| 2,048,937 | 7/1936 | Larson | 134/76 UX |
| 3,257,142 | 6/1966 | Barry . | |
| 3,421,638 | 1/1969 | Locke et al. | 414/788.7 |
| 3,658,197 | 4/1972 | DiDonato | 134/76 X |
| 3,765,546 | 10/1973 | Westerling | 414/788.7 |
| 3,887,094 | 6/1975 | Ikeda et al. | 134/76 X |
| 4,305,495 | 12/1981 | Zinke et al. | 134/76 |
| 4,563,031 | 1/1986 | Kishimoto et al. | 294/81.51 X |
| 4,568,231 | 2/1986 | Czajka et al. . | |
| 4,655,664 | 4/1987 | Feichtl et al. | 414/225 X |

FOREIGN PATENT DOCUMENTS

| | | |
|---|---|---|
| 385015 | 2/1988 | Austria . |
| 1001473 | 7/1957 | Fed. Rep. of Germany . |
| 2047537 | 3/1972 | Fed. Rep. of Germany . |
| 37336224 | 4/1989 | Fed. Rep. of Germany . |
| 2159211 | 6/1973 | France . |
| 2610609 | 8/1988 | France . |
| 61-114905 | 6/1986 | Japan . |
| 617355 | 7/1978 | U.S.S.R. .................... 134/76 |
| 1284890 | 1/1987 | U.S.S.R. .................... 53/540 |
| 782649 | 9/1957 | United Kingdom ........ 134/76 |

*Primary Examiner*—Frankie L. Stinson
*Attorney, Agent, or Firm*—Young & Thompson

[57] ABSTRACT

The present invention concerns a plant for treating mechanical pieces in a washing tank, of the type comprising at least one stationary washing tank, a horizontal rail positioned above said tank, a conveying unit movable along said rail and above the tank, suspension means associated to said conveying unit and apt to be lowered into said tank and to be lifted out thereof, and a plurality of baskets to contain said pieces to be treated, apt to be hooked to said suspension means. According to the invention, said baskets have a structure allowing them to be stacked in piles and they are provided with means for stacking them into a pile, consisting of lead-in centering means; furthermore, to said suspension means there are associated height detection means cooperating with the top of the baskets, so as to allow storing the baskets in piles directly on the floor, without having to use motored belt or roller conveyors.

18 Claims, 2 Drawing Sheets

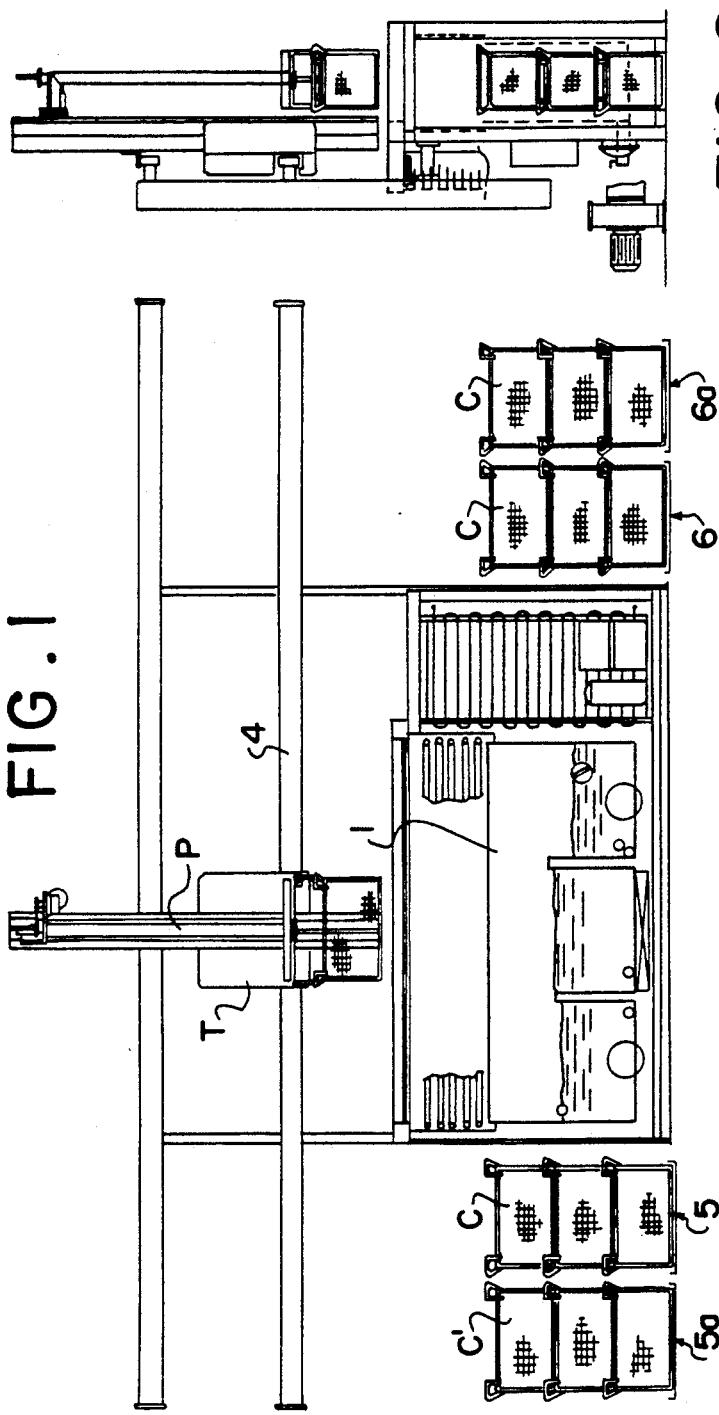
FIG. 1
FIG. 2
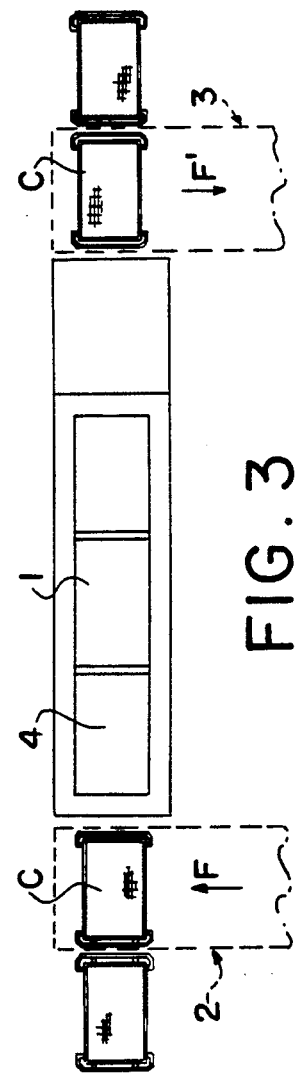
FIG. 3

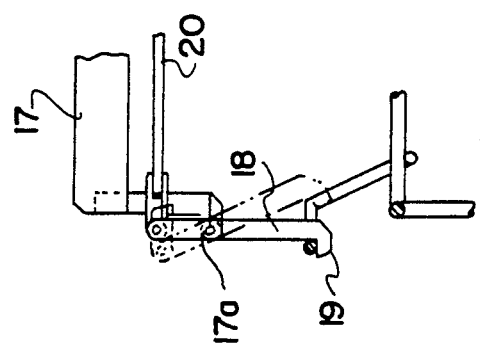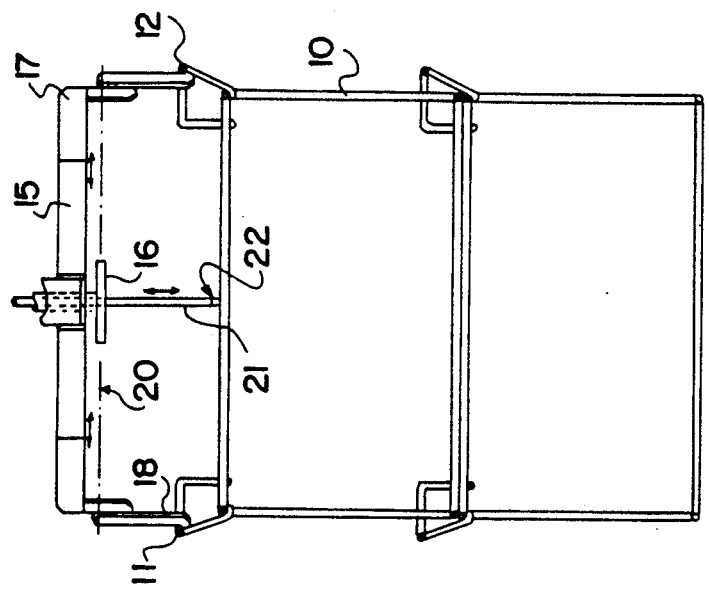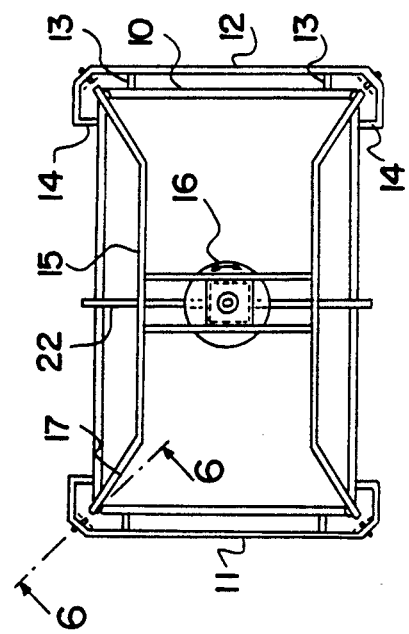

PLANT FOR TREATING MECHANICAL PIECES IN A WASHING TANK

BACKGROUND OF THE INVENTION

Automatic plants for industrial washing can be of various types, both as concerns the kind of treatment (immersion, spray washing, use of water-based detergents, or of trichloroethylene type solvents), and as concerns the automatic handling of the mechanical pieces being treated (screw or carousel conveyors, parallel vertical chain or horizontal chain conveyors, and the like).

The present invention concerns the most diffused type of automatic plant—as that described in DE-A-2047537 —comprising one or more washing tanks and loading and unloading stations, positioned on a line, as well as an automatic conveyor which collects the pieces from the loading station, moves them from one tank to the next, and discharges them in the unloading station.

The pieces are usually arranged into baskets of suitable shape. Hooking and release of the baskets are obtained, according to known technique, by providing said baskets with specially shaped handles with which snaps into engagement a hook fixed to the arm of an automatic conveyor.

Further according to known technique, to complete the automatic handling system of the pieces and to reduce the dwell time in the loading and unloading stations, for positioning and picking up the baskets, provision is made of two motored belt or roller conveyors, acting as provisional storage units and allowing the plant to have sufficient autonomy to require no intervention by the operator.

The drawbacks of such known plants can be summed up as follows:

- use has to be made of special baskets, wherein the cited shape of the respective handles limits the accessibility when filling and emptying the baskets; these baskets are moreover quite bulky and difficult to stack into piles; they finally involve considerable costs;
- the belt or roller conveyors involve considerable costs—also due to the presence of the necessary motion control devices—which heavily weigh on the general cost of the plant; they involve additional costs also from the maintenance point of view; finally, they take up a lot of space on the ground, which increases the more the autonomy required from the plant.

FIELD OF THE INVENTION

A first object of the present invention is therefore to realize a simplified plant, having no conveying systems and thus of reduced cost, and however allowing the same flexibility of use as the known plants. A further object of the invention is to provide a plant of reduced dimensions and thus occupying less surface. A still further object of the invention is to supply a plant which makes use of baskets adapted to be stacked into piles, and thus of more general use as well as of reduced cost.

In actual fact, a plant making use of stackable baskets is that described in JP-A-61114905, which provides for an automatic storage system, wherein the baskets are moved under the control of a computer which stores in a memory the position of each basket. The teaching of this patent cannot however be applied to the case of the present invention, not only because it involves a totally different field of use, but above all because, in the case of JP-A-61114905, the positioning and motion of the single baskets are exclusively controlled by the computer (which stores in a memory their position each time it changes), whereas in the case of the invention, the stacking and removal of the baskets is done manually, so that it would be practically impossible to memorize the positions of the baskets.

SUMMARY OF THE INVENTION

These and other objects are achieved—in a plant for treating mechanical pieces in a washing tank, of the type comprising at least one stationary washing tank, a horizontal rail positioned above said tank, a conveying unit movable along said rail and above the tank, suspension means associated with said conveying unit and adapted to be lowered into said tank and to be lifted out thereof, and a plurality of baskets to contain said pieces to be treated, adapted to be hooked to said suspension means— due to the fact that: the plant comprises at least two fixed stationing areas, positioned to the side of the tank in alignment with said rail, one for stacking at least one pile of baskets containing pieces to be treated, and the other for stacking at least one pile of baskets containing already treated pieces; said baskets are provided with means for stacking them into a pile, associated their upper and/or lower edge; with said suspension means there are associated height detection means co-operating with the top of the baskets, to supply a signal indicating the height of said pile of baskets; and a processing unit is moreover provided to control the motion of the baskets and the forming of the piles, starting from said height signal.

BRIEF DESCRIPTION OF THE DRAWINGS

Further characteristics and advantages of the plant according to the invention will appear more evident from the following detailed description of a preferred embodiment thereof, illustrated by way of example on the accompanying drawings, in which:

FIGS. 1, 2 and 3 are, respectively, very diagrammatic front, lateral and plan views of a plant according to the invention;

FIG. 4 is a diagrammatic front elevation showing two stacked baskets and a hooking and suspension device acting at the top of the pile, according to a preferred embodiment of the invention;

FIG. 5 is a plan view of the pile of baskets of Fig. 4; and

FIG. 6 is a partly sectioned lateral view, on an enlarged scale, showing the hooking of the baskets along the line VI—VI of Fig. 5.

DESCRIPTION OF THE PREFERRED EMBODIMENTS

As shown diagrammatically in the plan view of Fig. 3, a known type washing plant comprises—on the two sides of a washing tank 1—two belt conveyors 2 and 3, only partially indicated by dashed lines. In a plant of this type, the operating sequence is as follows: the baskets C are positioned on the belt 2 moving forward in the direction F. A gripping device—moving along the rail 4 positioned above the tank 1—picks up the first basket C from the belt 2 and transfers it into the tank 1 for the washing operation. The belt 2 moves forward in the direction of the arrow F carrying another basket to the position where it is picked up by the gripping device. At the end of the washing operation, the gripping device draws the basket C out of the tank and transfers it onto the belt 3, which moves forward in the direction F' towards a position where the basket is picked up by an operator. The length of the belts 2 and 3 is such as to allow storing enough baskets to satisfy the requirements of the plant.

As can be easily noted, the two belt conveyors 2 and 3 take up a considerable space around the tank 1. They involve furthermore high capital and running costs, as well as maintenance costs.

According to the invention—and as clearly shown in FIGS. 1 to 3—the two belt conveyors are instead entirely eliminated. At the sides of the tank 1 there are provided merely two stationing areas, indicated by 5, 5a and 6, 6a. The number of stationing areas can however be determined by the user according to the plant autonomy requirements. Each of the areas 5 or 6 is used for stacking at least one pile C of baskets, in the manner better described hereinafter.

A pile of two baskets is illustrated by way of example in FIG. 4. Each basket 10 is shaped as a parallelepipedon, for instance a rectangular parallelepipedon. According to the invention, each basket is equipped with a pair of handles 11, 12, in the form of a metal rod or tube, which run parallel to the minor sides of the basket and briefly around its upper corners; these handles are moreover slightly shifted above and outwardly in respect of the upper edges of the basket.

The handles 11, 12, are fixed onto the upper edges of the baskets by means of skew bars 13, 14, diverging upwardly outwardly in respect of said upper edges. In this way, the handles 11, 12 are adapted to perform a first centering function, by forming a bevel to guide the lower edge of another basket being positioned thereon.

Another function is to allow engaging thereon a hooking and suspension device as that shown in FIGS. 4 to 6. Said device consists of a frame 15, at the centre of which is mounted rotatably wheel 16. Arms 17, positioned along the diagonals of the basket 10, extend from the four corners of the frame 15. At the ends 17a of the arms 17 there are pivoted levers 18 (see FIG. 6), the lower end of which is provided with a hook 19 and the upper end of which is articulated to connecting rods 20. Such rods are then in turn hinged on the wheel 16.

In rest conditions, the connecting rods 20 are in their position of maximum extension and they keep the levers 18 in a disengaged position (shown in dashed lines in FIG. 6). When wishing to hook a basket, the wheel 16 is caused to rotate so as to return the connecting rods 20 towards the centre; in so doing, the connecting rods 20 act by pulling the top part of the levers 18, which thus rotate into the position shown in full lines in FIG. 6, causing their hook 19 to engage from underneath the handle 11 or 12 (basket hooking position).

The hooking and suspension device also comprises a feeler consisting of a vertical rod 21, mounted vertically slidable at the centre of the frame 15 and carrying at its lower end a horizontal rod 22 positioned transversally to the pile of baskets.

The plant according to the invention operates as follows: to convey a basket to be treated into the washing tank, the hooking and suspension unit T moves first of all above the stationing area 5, which holds a pile C of baskets to be treated; having reached this position, the unit causes the downward motion of the suspension arm P (in known manner), until the rod feeler 21, 22, meets the top basket of the pile. The feeler 21, 22, stops and rests the top basket of the pile and causes first of all the rotation of the wheel 16, which in turn operates the connecting rods 20 so as to lead the hooks 19 of the levers 18 into engagement with the handles 11 and 12.

To monitor the supply of baskets C positioned on the stationing area 5, the hooking and suspension unit T is provided with a height detection system which issues a change signal if said unit has reached a minimum predetermined height without its feeler having detected the presence of any basket. Said change signal can be used in two ways:
  simply as a signal to warn the operator dealing with the plant that the pile of baskets to be treated has come to an end and must be formed again, or else
  as a signal which the unit T is apt to process, accordingly providing to shift the hooking and suspension means into a second stationing area 5a (or of other successive areas, up to the end of a series of stationing areas, and then again from the start), so as to pick up baskets from another pile C', or from the successive piles.

Once the top basket of the pile C has been hooked, the unit T causes the upward motion of the suspension arm P and shifts towards the washing tank 1. The lowering and lifting of the basket into and out of the washing tank take place in known manner and shall not be described in further detail. It is merely mentioned that, when the basket is rested on the bottom of the washing tank, it can be released and hooked again by rotation of the wheel 16 of the unit T, in the way already described heretofore.

Once the washing is over, the basket is lifted out of the tank and carried above the stationing area 6. The suspension arm is moved down until the basket rests onto the floor or onto the top basket of the pile of already treated baskets. A correct lead-in is facilitated by the centering action of the handles 11, 12, and of the skew bars 13, 14. As soon as the basket is properly deposited, the further descent of the suspension arm is stopped by a signal issued from the feeler 21, 22.

Also in this case, the height detection system is adapted to detect whether the basket rests the underlying pile at a height exceeding a maximum predetermined value. Since this possibility corresponds to the fact that the pile is already complete, namely that it has reached the maximum predetermined height, the system issues a change signal which, also in this case, can be used in two ways:
  on the one hand, as a simple warning signal for the operator, so that he may provide to remove the pile of already treated baskets;
  on the other hand, as a signal adapted to control the shifting of the hooking and suspension unit towards another stationing area 6a (or towards other successive areas next to the area 6), until the piles are complete on all the stationing areas 6.

As can easily be understood, the plant according to the present invention involves very reduced costs—mainly due to the fact that it requires no belt conveyors 2, 3, to store a pile of baskets—and it provides, furthermore, for a high flexibility of use, since a single stationing area 5 or 6—or viceversa, an even considerable number of stationing areas—can easily be provided for, by simply acting on the program controlling the movement of the hooking and suspension unit T.

It is anyhow to be understood that the invention is not limited to the particular embodiment of the baskets illustrated on the drawings, but that many other embodiments are of course possible—both as concerns the structure of the baskets, and as concerns the hooking and suspension means—and easily obtainable for a technician skilled in the art, on the basis of the teachings supplied herein, without thereby departing from the scope of the invention itself.

According to a possible alternative embodiment, the baskets could for example be provided with handles 11, 12, only in the four corners of the basket, that is, only in the positions of engagement by the hooking and suspension device. Or, viceversa, said handles could be extended around the whole contour of the upper edge of the basket. According to another embodiment, the handles 11, 12, could be replaced by tabs of bent plate, welded to the four upper corners of the basket and having inclined surfaces, projecting towards the top and outwardly in respect of the basket, so as to form lead-in centering surfaces. The surface of each of said tabs can be provided with a hole forming an eyelet adapted to be engaged by the hooking and suspension device. According to a still further embodiment, said tabs could be provided in correspondence with the bottom corners of the baskets, so as to form lead-in centering feet, while the suspension device could simply hold onto the upper edges of the baskets. On the other hand, the lead-in centering means could also not consist of additional elements fixed to the basket, but said baskets could simply have the general shape of a right parallelepipedon, extending however into a lower end area with downward taper, forming a bevel to favour centering into the upper edge of an underlying basket.

Likewise, there could be different embodiments of the hooking and suspension means, by providing for example a toggle-type control mechanism, wherein the connecting rods controlling the hook levers are operated through the rectilinear motion of a slider, and not through the rotation of the wheel 16. Also in this case, the hooking is obtained-as shown in the drawings-by an outward shifting of the hooks 19, but it is evident that the hooks could also be shifted inwardly and the engagement could be done in the opposite sense.

We claim:

1. In a plant for treating mechanical pieces in a washing tank, of the type comprising at least one stationary washing tank, a horizontal rail positioned above said tank, a conveying unit movable along said rail and above the tank, suspension means associated with said conveying unit and adapted to be lowered into said tank and to be lifted out thereof, and a plurality of baskets to contain said pieces to be treated, adapted to be hooked to said suspension means; the improvement wherein
it comprises at least two fixed stationing areas positioned on opposite sides of the tank, in alignment with said rail, one for stacking at least one pile of baskets containing pieces to be treated, and the other for stacking at least one pile of baskets containing already treated pieces;
said baskets have means for stacking them into a pile, associated with their upper and/or lower edge;
with said suspension means there are associated height detection means cooperating with the top of the baskets, to supply a signal indicating the height of said pile of baskets; and
a processing unit responsive to said height signal to control the motion of the baskets and the forming of the piles.

2. Plant as in claim 1, wherein said baskets are shaped essentially as a right parallelepipedon and said stacking means comprise lead-in centering means.

3. Plant as in claim 2, wherein said lead-in centering means consist of handles in the form of a metal rod or tube, running around the upper corners of the basket, slightly shifted above and outwardly in respect of its upper edges, and connected to said basket by means of skew bars.

4. Plant as in claim 3, wherein said baskets are in the form of a rectangular parallelepipedon and said handles run parallel to the two opposite minor sides of the basket and briefly around its corners.

5. Plant as in claim 3, wherein said handles extend around the whole contour of the upper edge of the basket.

6. Plant as in claim 3, wherein said handles form at the same time engagement means for said suspension means.

7. Plant as in claim 2, wherein said lead-in centering means consist of tabs of bent plate, fixed in correspondence with the upper corners of the baskets and projecting sideways towards the top and outwardly in respect of said corners.

8. Plant as in claim 7, wherein said tabs comprise at least one through hole, forming an eyelet to hook said suspension means.

9. Plant as in claim 2, wherein said lead-in centering means consist of a lower edge area with downward taper, forming a bevel to favour centering into the upper edge of an underlying basket.

10. Plant as in claim 9, wherein the upper edge of said baskets forms at the same time engagement means for said suspension means.

11. Plant as in claim 2, wherein said lead-in centering means consist of tabs of bent plate, forming rest feet and fixed in correspondence of the bottom corners of the baskets, projecting sideways, downwards and outwardly in respect of said corners.

12. Plant as in claim 1, wherein with said suspension means there are associated hooking means, adapted to be shifted from a position engaging and carrying said baskets, to a position of release thereof.

13. Plant as in claim 12, wherein said suspension means comprise a support frame, a set of hook levers mounted oscillating on the frame ends, and a set of connecting rods slidable in respect of the frame, said rods being hinged at one end on said oscillating levers and being connected at the other end to operating means positioned at the centre of the frame.

14. Plant as in claim 13, wherein said connecting rods are positioned substantially radially in respect of the frame centre, where they are hinged onto a wheel mounted revolvingly about a vertical axis.

15. Plant as in claim 13, wherein said connecting rods are positioned substantially radially in respect of the frame centre, where they are connected to a slider with rectilinear motion, with which they form a toggle system.

16. Plant as in claim 12, wherein said height detection means control the operation of said hooking means.

17. Plant as in claim 16, wherein said height detection means issue a change signal as they detect a predetermined maximum height of said pile of baskets containing already treated pieces.

18. Plant as in claim 16, wherein said height detection means issue a change signal as they detect a predetermined maximum height of said pile of baskets containing pieces to be treated.

* * * * *